(12) United States Patent
Best et al.

(10) Patent No.: US 12,514,157 B2
(45) Date of Patent: Jan. 6, 2026

(54) SYSTEMS AND METHODS FOR PREDICTIVE DATA SELECTION AND CONTROL

(71) Applicant: Deere & Company, Moline, IL (US)

(72) Inventors: Cody W. Best, Silvis, IL (US);
Giuliano Costantini, Kaiserslautern (DE)

(73) Assignee: Deere & Company, Moline, IL (US)

( * ) Notice: Subject to any disclaimer, the term of this patent is extended or adjusted under 35 U.S.C. 154(b) by 79 days.

(21) Appl. No.: 18/400,152

(22) Filed: Dec. 29, 2023

(65) Prior Publication Data
US 2025/0212724 A1 Jul. 3, 2025

(51) Int. Cl.
*A01D 41/127* (2006.01)

(52) U.S. Cl.
CPC .................. *A01D 41/127* (2013.01)

(58) Field of Classification Search
None
See application file for complete search history.

(56) References Cited

U.S. PATENT DOCUMENTS

| 11,794,751 B2 * | 10/2023 | Zarringhalam ..... B60W 40/072 |
| 2020/0323133 A1 | 10/2020 | Anderson et al. |
| 2020/0326674 A1 * | 10/2020 | Palla ..................... A01D 41/141 |
| 2021/0022283 A1 * | 1/2021 | Vandike ............. G01C 21/3807 |
| 2022/0365536 A1 * | 11/2022 | Vilar .................. G06Q 10/0633 |

* cited by examiner

*Primary Examiner* — Peter D Nolan
*Assistant Examiner* — Matthew Cobb
(74) *Attorney, Agent, or Firm* — Kelly, Holt & Christenson; Joseph R. Kelly

(57) ABSTRACT

A computer implemented method includes: obtaining a plurality of predictive data, each predictive data indicative of respective predictive values of a characteristic corresponding to geographic locations at a worksite; obtaining in-situ data indicative of in-situ values of the characteristic corresponding to the geographic locations at the worksite; determining a respective accuracy of each predictive data based on the respective predictive values of the characteristic and the in-situ values of the characteristic; identifying, based on the respective accuracy of each predictive data, a set of qualified predictive data comprising two or more of the predictive data; determining whether a selection condition is present at the worksite; selecting one qualified predictive data, of the set of qualified predictive data, as selected qualified predictive data based on the determination of whether the selection condition is present at the worksite; and controlling a mobile work machine based on the selected qualified predictive data.

15 Claims, 10 Drawing Sheets

SYSTEMS AND METHODS FOR PREDICTIVE DATA SELECTION AND CONTROL

FIELD OF THE DESCRIPTION

The present description relates to agricultural operations. More specifically, the present description relates to selection of predictive sources and control based thereon.

BACKGROUND

There are a wide variety of different types of mobile work machines, for instance, mobile agricultural machines. The mobile work machines operate at a worksite (e.g., a field) to carry out an operation. In some instances, a mobile work machine may obtain predictive data. The predictive data may provide predictive characteristics that are useful in predictively controlling a mobile work machine in carrying out the operation.

The discussion above is merely provided for general background information and is not intended to be used as an aid in determining the scope of the claimed subject matter.

SUMMARY

A computer implemented method includes: obtaining a plurality of predictive data, each predictive data indicative of respective predictive values of a characteristic corresponding to geographic locations at a worksite; obtaining in-situ data indicative of in-situ values of the characteristic corresponding to the geographic locations at the worksite; determining a respective accuracy of each predictive data based on the respective predictive values of the characteristic and the in-situ values of the characteristic; identifying, based on the respective accuracy of each predictive data, a set of qualified predictive data comprising two or more of the predictive data; determining whether a selection condition is present at the worksite; selecting one qualified predictive data, of the set of qualified predictive data, as selected qualified predictive data based on the determination of whether the selection condition is present at the worksite; and controlling a mobile work machine based on the selected qualified predictive data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
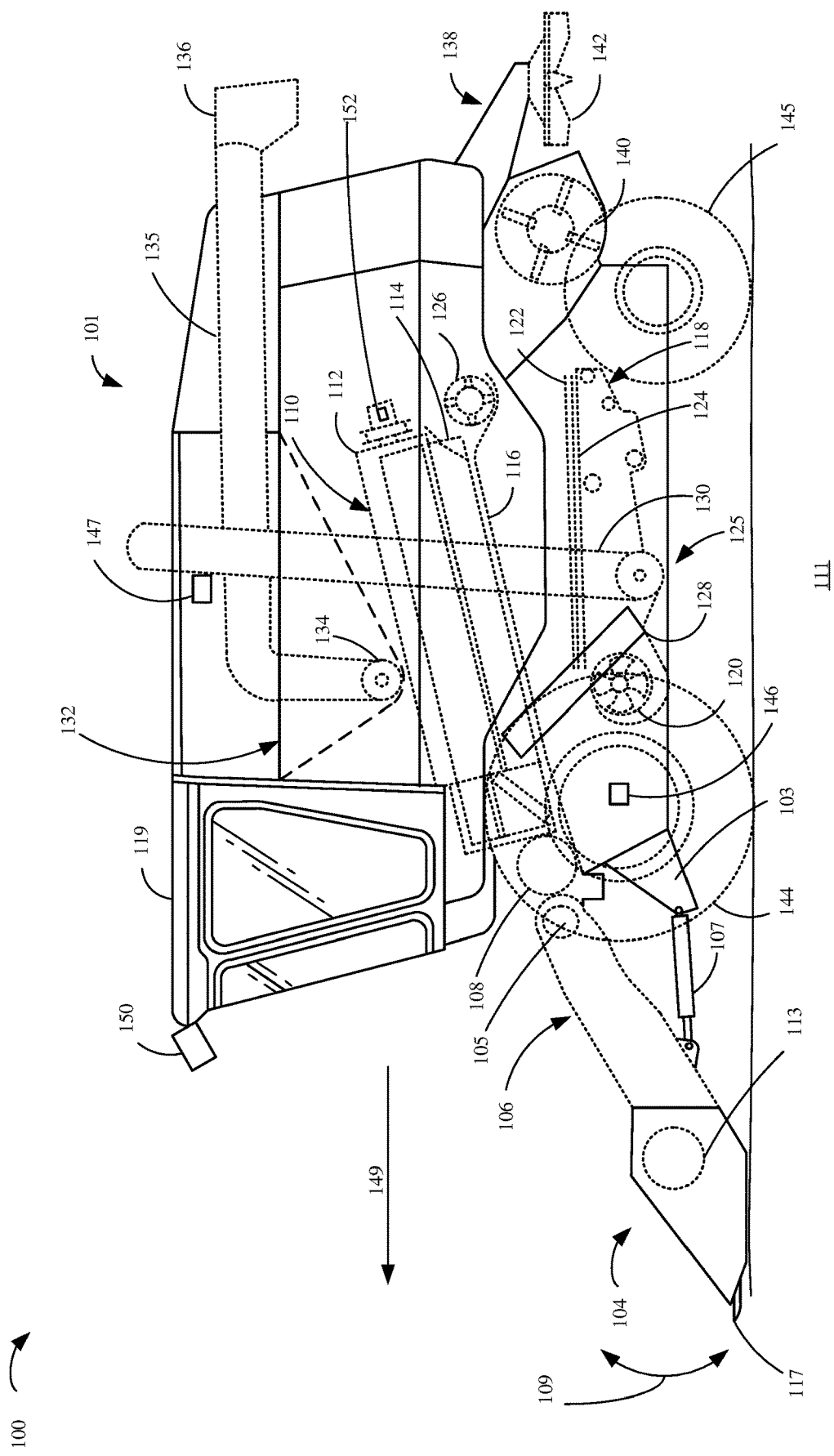
FIG. 1 is a partial pictorial, partial schematic illustration of one example mobile work machine.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

As discussed above, a mobile work machine may obtain predictive data from one or more predictive sources and use the predictive data to control the mobile work machine in performing an operation. For example, the predictive data may provide predictive characteristics of the worksite at locations ahead of the mobile work machine (relative to a direction of travel or route of the mobile work machine) such that the machine can be predictively controlled (i.e., settings can be adjusted in a timely manner such that they are at desired levels, relative to the predictive characteristic(s), at the time the machine encounters the predictive characteristic(s)). The predictive data can be predictive of one or more characteristics, such as predictive performance characteristics of the machine, predictive characteristics of the worksite, predictive characteristics of the environment of the worksite, as well as a variety of other predictive characteristics. Each predictive data may be generated in a different way than another predictive data. For example, each predictive data may be generated using a different type of data collection mechanism (e.g., a different type of sensor), based on different input data, or using a different algorithm (e.g., model).

It can be difficult for the mobile work machine (or operator thereof) to select which of the plurality of predictive data to utilize in controlling the mobile work machine. For a variety of reasons, one predictive data may be more accurate than another predictive data. It may be ideal to control the mobile work machine using the most accurate predictive data, however, it may be difficult for the mobile work machine (or the operator thereof) to discern which predictive data is most accurate. In some examples, all (or a plurality) of the predictive data may be satisfactorily accurate (e.g., satisfactorily accurate relative to a threshold level). However, it may be desirable to use one predictive data over another predictive data, even when both are satisfactorily accurate. For example, for processing or latency purposes, it may be better to use a predictive map over predictive sensor data generated by a forward-looking sensor system. For instance, a predictive map may show predictive characteristics farther out than the predictive sensor data generated by the forward-looking sensor system.

In some examples, all (or a plurality) of the predictive data may have satisfactory accuracy (e.g., satisfactorily accurate relative to a threshold level) in high-frequency conditions (i.e., the conditions generally, and most frequently, encountered at the worksite) but in low-frequency conditions (e.g., transitory conditions) one accurate predictive data may be better suited for use during the transitory condition than another accurate predictive data. For example, predictive data from a forward-looking sensor system on the mobile work machine and predictive data from a satellite-based sensor system (e.g., a predictive map) may be satisfactorily accurate at a high-frequency (e.g., may both be accurate for at least ninety percent of instances at the worksite) but during a low-frequency (or transitory) condition at the worksite, it may be better to use one over the other. For example, if the low-frequency (or transitory) condition is an obscurant at the worksite (e.g., dust in the air, object obscuring the field of view of the forward-looking sensor system, etc.) it may be better to use a predictive map instead of predictive data generated by a forward-looking sensor system. In another example, if the low-frequency (or transitory) condition is the occurrence of slug feeding (in the case of a mobile work machine in the form of a mobile agricultural harvesting machine) it may be better to use predictive data generated by a forward-looking sensor system instead of a predictive map. It can be difficult for the mobile work machine (or the operator thereof) to discern which predictive source to utilize during the transitory condition.

The present discussion proceeds, in some examples, with respect to systems and methods that determine the accuracy of each of a plurality of predictive data. The systems and methods then identify a set of qualified predictive data, based on the accuracy determination. The systems and methods then select one qualified predictive data of the set of qualified predictive data. The selected qualified predictive data is then used in controlling the mobile work machine. In some examples, the systems and methods determine whether a selection condition is present, and, if so, select one qualified predictive data of the set of qualified predictive data based on the presence of the selection condition. In some examples, where no selection condition is present, the systems and methods select one qualified predictive data of the set of qualified predictive data based on preset selection rules.

It will be noted that while the various examples discussed herein proceed in the context of mobile agricultural machines, such as mobile agricultural harvesting machines, the systems and methods described herein are applicable to and can be used in various other mobile work machines. For example, but not by limitation, the systems and methods described herein are applicable to and can be used in mobile construction machines, mobile forestry machines, mobile turf management machines, as well as various other mobile work machines.

FIG. 1 is a partial pictorial, partial schematic illustration of one example of a mobile work machine 100. In the example shown in FIG. 1, mobile work machine 100 is the form of a mobile agricultural harvesting machine 101 (illustratively a combine harvester). As illustrated in FIG. 1, harvesting machine 101 includes ground engaging traction elements (wheels or tracks) 144 and 145 which can be driven by a propulsion subsystem (e.g., motor or engine and other drivetrain elements) to propel harvesting machine 101 across a worksite 111 (e.g., a field). Harvesting machine 101 includes an operator compartment or cab 119, which can include a variety of different operator interface mechanisms (e.g., 318 shown in FIG. 2) for controlling harvesting machine 101 as well as for displaying various information. Harvesting machine 101 includes a feeder house 106, a feed accelerator 108, and a thresher generally indicated at 110. The feeder house 106 and the feed accelerator 108 form part of a material handling subsystem 125. Header 104 is pivotally coupled to a frame 103 of harvesting machine 101 along pivot axis 105. One or more actuators 107 drive movement of header 104 about axis 105 in the direction generally indicated by arrow 109. Thus, a vertical position of header 104 (the header height) above ground over which the header 104 travels is controllable by actuating actuator 107. While not shown in FIG. 1, agricultural harvesting machine 101 may also include one or more actuators that operate to apply a tilt angle, a roll angle, or both to the header 104 or portions of header 104.

Figure 2:
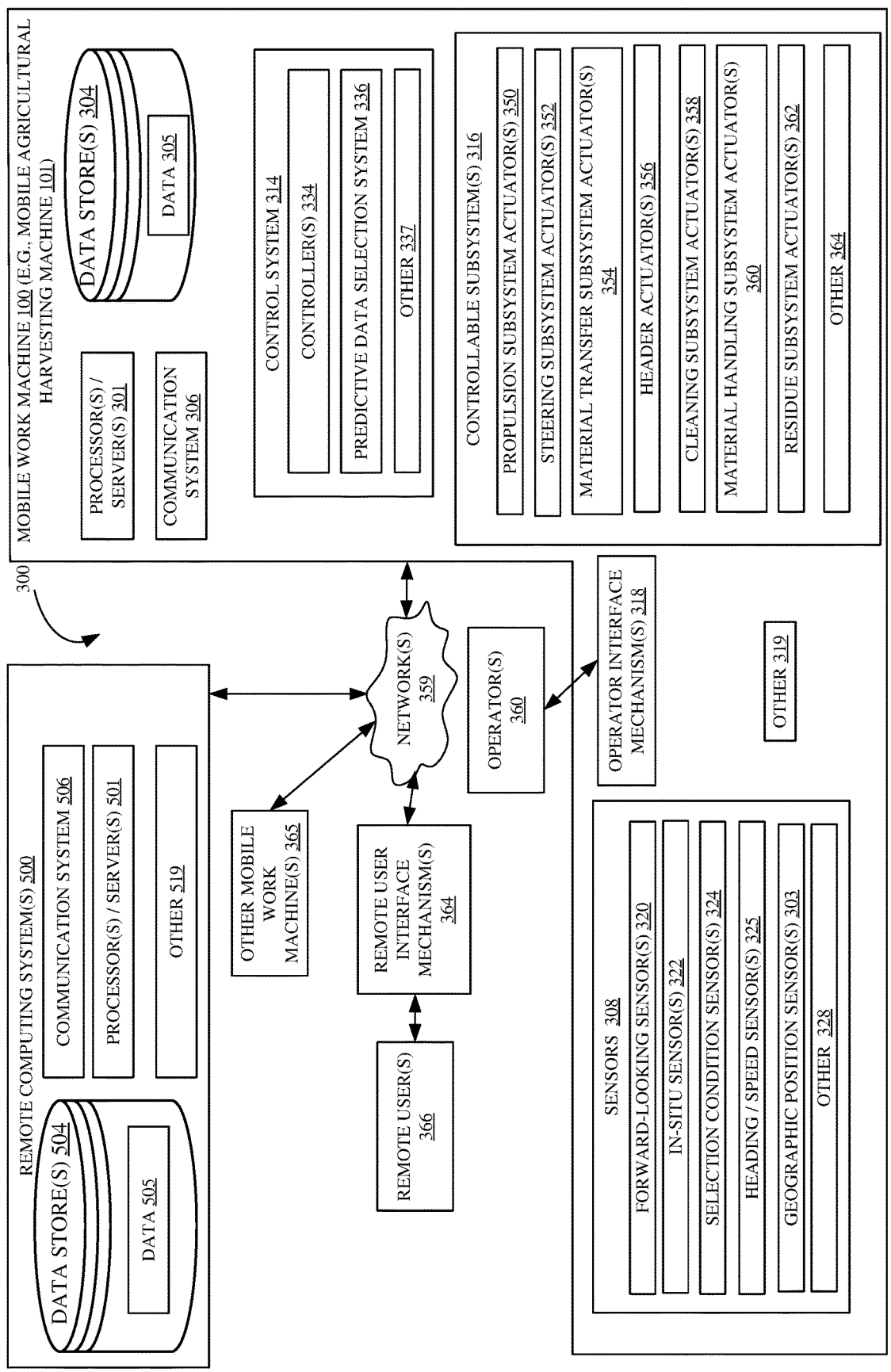
FIG. 2 is a block diagram of one example work system architecture.

It will be understood that header 104, as illustrated in FIG. 1, is a corn header and thus includes various components, such as stalk rollers, gathering chains, and deck plates, not shown in FIG. 1, which may be controllably actuated by one or actuators (e.g., header actuators 356 shown in FIG. 2). In other examples, header 104 can be another type of header. For instance, in other examples, header 104 could include a controllable reel, draper belt(s), as well as various other components which can be controllably actuated by one or more actuators. Thus, it will be understood that the orientation (e.g., height, tilt, roll) of header 104 can be controlled and that components of the header 104 can be controlled.

Agricultural harvesting machine 101 includes a material handling subsystem 125 that includes a thresher 110 which illustratively includes a threshing rotor 112 and a set of concaves 114. Further, material handling subsystem 125 also includes a separator 116. Agricultural harvesting machine 100 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, and clean grain elevator 130. The clean grain elevator moves clean grain into a material receptacle (or clean grain tank) 132.

Harvesting machine 101 also includes a material transfer subsystem that includes a conveying mechanism 134, a chute 135, and a spout 136. Conveying mechanism 134 can be a variety of different types of conveying mechanisms, such as an auger or blower. Conveying mechanism 134 is in communication with clean grain tank 132 and is driven (e.g., by an actuator, such as motor or engine) to convey material from grain tank 132 through chute 135 and spout 136. Chute 135 is rotatable through a range of positions from a storage position (shown in FIG. 1) to a variety of deployed positions away from agricultural harvesting machine 100 to align spout 136 relative to a material receptacle (e.g., grain cart, towed trailer, etc.) that is configured to receive the material within grain tank 132. Spout 136, in some examples, is also independently moveable to adjust the direction of the material stream exiting spout 136.

Harvesting machine 101 also includes a residue subsystem 138 that can include chopper 140 and spreader 142. In some examples, a harvesting machine within the scope of the present disclosure may have more than one of any of the subsystems mentioned above. In some examples, harvesting machine 100 may have left and right cleaning subsystems, separators, etc., which are not shown in FIG. 1.

In operation, and by way of overview, harvesting machine 100 illustratively moves through a field 111 in the direction indicated by arrow 149. As harvesting machine 100 moves, header 104 engages the crop plants to be harvested and cuts the crop plants with a cutter bar 113 on the header 104 to generate cut crop material.

The cut crop material is engaged by a cross auger 113 which conveys the cut crop material to a center of the header 104 where the cut crop material is then moved through a conveyor in feeder house 106 toward feed accelerator 108, which accelerates the cut crop material into thresher 110. The cut crop material is threshed by threshing element 112 rotating the crop against concaves 114. Threshing element 112, in FIG. 1, is illustratively a threshing rotor, but in other examples could be other types of threshing elements (e.g., threshing cylinders, etc.), or a combination of threshing elements (e.g., threshing cylinder(s) and threshing rotor(s), etc.). The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvesting machine 101 in a windrow.

Grain falls to cleaning subsystem 118. Chaffer 122 separates some larger pieces of MOG from the grain, and sieve 124 separates some of finer pieces of MOG from the grain. The grain then falls to an auger that moves the grain to an inlet end of grain elevator 130, and the grain elevator 130 moves the grain upwards, depositing the grain in grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in harvesting machine 100 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

Harvesting machine 101 can include a variety of sensors, some of which are illustrated in FIG. 1, such as ground speed sensor 146, one or more mass flow sensors 147, one or more forward-looking sensor systems 150, and one or more rotor drive force sensors 152.

Ground speed sensor 146 senses the travel speed of harvesting machine 101 over the ground. Ground speed sensor 146 may sense the travel speed of the harvesting machine 101 by sensing the speed of rotation of the ground engaging traction elements 144 or 145, or both, a drive shaft, an axle, or other components. In some instances, the travel speed may be sensed using a positioning system, such as a global positioning system (GPS), a dead reckoning system, a long range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when harvesting machine 101 is on a slope, the orientation of harvesting machine 101 relative to the slope is known. For example, an orientation of harvesting machine 101 could include ascending, descending or transversely travelling the slope.

Mass flow sensors 147 sense the mass flow of material (e.g., grain) through clean grain elevator 130. Mass flow sensors 147 may be disposed at various locations, such as within or at the outlet of clean grain elevator 130. In some examples, the mass flow rate of material sensed by mass flow sensors 147 is used in the calculation of yield as well as in the calculation of the fill level of the on-board material tank 132. In some examples, mass flow sensors 147 include an impact (or strike) plate that is impacted by material (e.g., grain) conveyed by clean grain elevator and a force or load sensor that detects the force or load of impact of the material on the impact (or strike) plate. This is merely one example of a mass flow sensor.

Forward-looking sensor systems 150 can include one or more of a variety of sensors, such as cameras (e.g., mono or stereo cameras), lidar, radar, ultrasonic sensors, as well as various other sensors, such as various other sensors configured to emit and/or receive electromagnetic radiation. While FIG. 1 shows some example positions of forward-looking sensor systems 150, it will be understood that forward-looking sensor systems 150 can be positioned (or otherwise disposed) at a variety of other locations on harvesting machine 101. Forward-looking sensor systems detect characteristics ahead of the harvesting machine and generate sensor data (e.g., sensor signals, images, etc.) indicative of the detected characteristics. The detected characteristics may then be used to predict one or more other characteristics.

Threshing element drive force sensors 152 can include torque sensors, pressure sensors, current sensors, voltage sensors, as well as various other types of sensors, that detect a force (e.g., torque, fluid (hydraulic) pressure, electric energy, etc.) used to drive the threshing element 112. The force used to drive the threshing element 112 at a given (set) speed can be indicative of the biomass of material being processed by the threshing element 112. The force used to drive the threshing element 112 at a given speed will increase as biomass increases.

Harvesting machine 101 can include various other sensors, some of which will be discussed below.

FIG. 2 is a block diagram of a work system architecture 300 (e.g., an agricultural system architecture 300) in more detail. FIG. 2 shows that work system architecture 300 (also called work system 300 herein) includes one or more mobile work machines 100, one or more remote computing systems 500, one or more remote user interfaces 364, one or more other mobile work machines 365, and one or more networks 359. In the illustrated example, mobile work machines 100 are in the form of a mobile agricultural harvesting machine 101. However, it will be understood that in other examples, other types of mobile work machines 100 can be included in work system 300. Other mobile work machines 365 can be other mobile agricultural harvesting machines, similar to agricultural harvesting machine 101, or can be other types of mobile work machines. In some examples, other mobile work machines 365 can be follow work machines that follow or otherwise operate at the worksite behind or after mobile work machine 100.

Harvesting machine 101, itself, illustratively includes one or more processors or servers 301, one or more data stores 304, a communication system 306, one or more sensors 308, a control system 314, one or more controllable subsystems 316, and can include various other items and functionality 319. Remote computing systems 500, themselves, illustratively include one or more processors or servers 501, one or more data stores 504, a communication system 506, and can include various other items and functionality 519.

Data stores 304 and 504 store a variety of data (generally indicated as data 305 and data 505 respectively), some of which will be described in more detail herein. For example, data store 304 or data store 504, or both, can include, among other things, predictive data, such as predictive worksite maps, selection rules, threshold data, sensor data generated by sensors (e.g., 308), operator inputs, user inputs, as well as a variety of other data. Additionally, data 305 can include computer executable instructions that are executable by one or more processors or servers to implement other items or functionalities of agricultural system 300. Additionally, data 505 can include computer executable instructions that are executable by one or more processors or servers 501 to implement other items or functionalities of agricultural system 300. It will be understood that data stores 304 and data stores 504 can include different forms of data stores, for instance one or more of volatile data stores (e.g., Random Access Memory (RAM)) and non-volatile data stores (e.g., Read Only Memory (ROM), hard drives, solid state drives, etc.).

Sensors 308 can include one or more forward-looking sensors 320, one or more in-situ sensors 322, one or more heading/speed sensors 325, one or more geographic position sensors 303, and can include various other sensors 328 as well.

Forward-looking sensors 320 can include one or more of a variety of sensors, such as one or more of cameras (e.g., mono or stereo cameras, or both), lidar, radar, ultrasonic sensors, as well as various other sensors, such as various other sensors configured to emit and/or receive electromagnetic radiation. Forward-looking sensors 320 detect characteristics ahead of (relative to a travel direction or route) harvesting machine 101 and generate sensor data (e.g., sensor signals, images, etc.) indicative of the detected characteristics. The sensor data, indicative of the detected characteristics, may then be used to predict one or more other characteristics. As an example, a forward-looking sensor 320 may detect a height of crop ahead of harvesting machine 101 and generate sensor data indicative of the detected height of crop. The sensor data, indicative of the detected height of crop, may then be used to predict a biomass of the crop ahead of harvesting machine 101. This is merely one example. In some examples, forward-looking sensors 320 are similar to forward-looking sensor systems 150.

In-situ sensors 322 detect various characteristics as the harvesting machine 101 operates and generate sensor data indicative of the various characteristics. For example, in-situ sensors 322 can include sensors that detect operating parameters of harvesting machine 101, such as sensors that detect the height and/or orientation (e.g., roll, tilt, yaw, etc.) of components of harvesting machine 101 (e.g., sensors that detect height and or orientation of header 104), sensors that detect the orientation of harvesting machine 101 (e.g., inertial measurement units, gyroscopes, accelerometers, etc.), sensors that detect operating speeds of components of harvesting machine 101 (e.g., sensors that detect a speed of the threshing element 112), sensors that detect a force (e.g., torque, electrical power, fluid (e.g., hydraulic, pneumatic, etc.) pressure, etc.) used to drive (or power) one or more components of harvesting machine (e.g., sensors that detect a force used to drive the threshing element 112), as well as various other sensors that detect various other operating parameters of harvesting machine 101. In-situ sensors 322 can include sensors that detect performance parameters of harvesting machine 101, such as sensors that detect yield (e.g., sensors that detect mass flow of crop material into grain tank 132, sensors that detect weight of material in grain tank 132, etc.), sensor that detect material flow, sensors that detect grain cleanliness (or 9 clean grain), sensors that detect grain brokenness (or broken grain), sensors that detect grain loss, sensors that detect fuel consumption, sensors that detect harvest rate, as well as various other sensors that detect various other performance parameters of harvesting machine 101. In-situ sensors 322 can include sensors that detect characteristics of the material (grain and material other than grain (MOG)) collected by harvesting machine 101, such as sensors that detect grain moisture levels or MOG moisture levels, or both, sensors that detect levels of constituents (e.g., starch, protein, oil, etc.) of grain, as well as various other sensors that detect various other characteristics of material collected by harvesting machine 101. In-situ sensor 322 can include sensors that detect characteristics of the worksite, such as sensors that detect the topography of the worksite (e.g., cameras, lidar, radar, ultrasonic, inertial measurement units, etc.), sensors that detect tractability of the worksite (e.g., wheel slip sensors, etc.), as well as various other sensors that detect various other characteristics of the worksite. In-situ sensors 322 can include sensor that detect characteristics of the environment of the worksite, such as sensors that detect weather conditions at the worksite, as well as various other sensors that detect various other characteristics of the environment of the worksite.

Selection condition sensors 324 detect various characteristics indicative of whether a selection condition is present during the operation of the mobile work machine 100 and generate sensor data indicative of the various characteristics indicative of whether a selection condition is present during the operation of the mobile work machine 100. For example, selection condition sensors 324 may detect slug feeding, obscurants at the worksite (e.g., dust in the air, camera lens cleanliness, ambient light levels, etc.), characteristics of the vegetation at the worksite (e.g., level of greenness of the vegetation), characteristics of the worksite (e.g., topographic characteristics, etc.) as well as various other characteristics indicative of selection conditions.

It will be understood, that in some examples, one sensor may be used as two or more of a forward-looking sensor 320, an in-situ sensor 322, and a selection condition sensor 324. For example, a sensor may be used as a forward-looking sensor 320 to provide sensor data used for deriving predictive values of characteristics ahead of the mobile work machine 100 and be used as a selection condition sensor 324 to provide sensor data used for detecting the presence of selection conditions. For example, a camera could be used to predict biomass ahead of the mobile work machine 100 and to detect the presence of a selection condition (e.g., obscurants, greenness of vegetation, etc.) at the worksite. In another example, a sensor may be used as an in-situ sensor 322 to provide in-situ (or ground truth) values of a characteristic and as a selection condition sensor 324 to provide sensor data used for detecting the presence of selection conditions. For example, a threshing element drive force sensor could be used to detect in-situ (or ground truth values) of biomass and to detect the presence of a selection condition (e.g., slug feeding) at the worksite. In another example, time of flight sensors could be used to predict characteristics ahead of the mobile work machine 100 and to detect the presence of a selection (e.g., variable topography, etc.).

Heading/speed sensors 325 detect a heading characteristic (e.g., travel direction) or speed characteristics (e.g., travel speed, acceleration, deceleration, etc.), or both, of harvesting machine 101. This can include sensors that sense the movement (e.g., rotation) of ground- or movement of components coupled to the ground engaging elements or other elements, or can utilize signals received from other sources, such as geographic position sensors 303. Thus, while heading/speed sensors 325 as described herein are shown as separate from geographic position sensors 303, in some examples, machine heading/speed is derived from signals received from geographic position sensors 303 and subsequent processing. In other examples, heading/speed sensors 325 are separate sensors and do not utilize signals received from other sources.

Geographic position sensors 303 illustratively sense or detect the geographic position or location of harvesting machine 101. Geographic position sensors 303 can include, but are not limited to, a global navigation satellite system (GNSS) receiver that receives signals from a GNSS satellite transmitter. Geographic position sensors 303 can also include a real-time kinematic (RTK) component that is configured to enhance the precision of position data derived from the GNSS signal. Geographic position sensors 303 can include a dead reckoning system, a cellular triangulation system, or any of a variety of other geographic position sensors.

Controllable subsystems 316 can include one or more propulsion subsystem 350 actuators, one or more steering subsystem actuators 352, one or more material transfer subsystem actuators 354, one or more header actuators 356, one or more cleaning subsystem actuators 358, one or more material handling subsystem actuators 360, one or more residue subsystem actuators 362, as well as various other controllable subsystems 364.

Propulsion subsystem actuators 350 include actuators that are controllable to adjust a travel speed of harvester 100. Propulsion subsystem actuators 352 can include an engine, motor(s), pump(s), as well as variety of other actuators, that are operable to adjust movement (e.g., adjust speed of rotation) of ground engaging traction elements (e.g., 144 or 145).

Steering subsystem actuators 352 include actuators that are controllable to adjust a heading of harvesting machine 101. Steering subsystem actuators 352 can include hydraulic or electrical actuators that are operable to adjust the orientation (steering or turning angle) of ground engaging traction elements (e.g., 144 or 145).

Material transfer subsystem actuators 354 include actuators (e.g., hydraulic, electric, pneumatic, etc.) to actuate a material transfer subsystem between a stored position and a variety of deployed positions (e.g., to cause extension and retraction of the material transfer subsystem) as well as actuators (e.g., motor, engine, pump, etc.) used to drive the conveying mechanism (e.g., auger, blower, etc.) of material transfer subsystem. Thus, material transfer subsystem actuators 354 include actuators that are controllable to actuate (extend and retract) material transfer subsystem and actuators that are controllable to actuate (drive) the conveying mechanism of the material transfer subsystem.

Header actuators 356 include actuators that are controllable to adjust a position or orientation, or both, of header 104, such as the height, tilt (pitch), or roll of header 104. Header actuators 356 can also include actuators that are controllable to adjust a position or a speed of various components of header 104. Depending on the type of header, the components will vary. Some example components include a reel, draper belt(s), cutter (or cutter bar), cross-auger(s), deck plates, gathering chains, stalk rollers, as well as variety of other components. Header actuators 356 can include hydraulic actuators, electrical actuators, pneumatic actuators, as well as other types of actuators.

Cleaning subsystem actuators 358 include actuators that are controllable to adjust a position or a speed of various components of cleaning subsystem 118, such as a speed of cleaning fan 120, a position (e.g., to control the size of openings) of chaffer 122 or of sieve 124, or both. Cleaning subsystem actuators 350 can include hydraulic, electrical, or pneumatic actuators.

Material handling subsystem actuators 360 include actuators that are controllable to adjust a position or a speed of various components of material handling subsystem 125, such as the speed of the threshing element 112 or a position of concave(s) 114 to control a spacing between the concave (s) 114 and the threshing element 112 (sometimes referred to a concave clearance), the speed of the discharge beater 126, the speed of the tailings elevator 128, or the speed of the clean grain elevator 130. Material handling subsystem actuators 360 can include hydraulic, electrical, or pneumatic actuators.

Residue subsystem actuators 362 include actuators that are controllable to adjust a position or a speed of various components of residue subsystem 138, such as the position or speed of chopper 140 or the position or speed of spreader 142. Residue subsystem actuators 362 can include hydraulic, electrical, or pneumatic actuators.

Harvester 100 can include a variety of other controllable subsystems 364. These other controllable subsystems 362 can include various actuators for controlling operating parameters (e.g., position, speed, etc.) of various corresponding components of harvesting machine 101.

Control system 314 can include one or more controllers 334, predictive data selection system, and can include various other items 337. Controllers 334 illustratively generate control signals to control controllable subsystems 316 as well as other items of agricultural system 300 (e.g., operator interface mechanisms 318 or user interface mechanisms 364 or other mobile work machines 365). In one example, each subsystem 316 can have a dedicated controller 334. In another example, a central controller 334 can control a plurality of the controllable subsystems 316. Controllers 334 can generate control signals based on various data, including sensor data generated by sensors 308, predictive data in data 305 or 505, or based on outputs of predictive data selection system 336. Predictive data selection system 336 generally selects a source of predictive data to use in controlling a mobile work machine 100. Predictive data selection system 336 will be discussed in more detail in FIG. 3.

Communication system 306 is used to communicate between components of a mobile work machine 100 or with other items of agricultural system 300, such as remote computing systems 500 and remote user interface mechanisms 364. Communication system 506 is used to communicate between components of a remote computing system 500 or with other items of agricultural system 300, such as other remote computing systems 500, mobile work machines 100 and remote user interface mechanisms 364.

Communication systems 306 and 506 can each include one or more of wired communication circuitry and wireless communication circuitry, as well as wired and wireless communication components. In some examples, communication systems 306 and 506 can each be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication systems 306 and 506 can each also include a system that facilitates downloads or transfers of information to and from a secure digital (SD) card or a universal serial bus (USB) card, or both. Communication systems 306 and 506 can each utilize network 359. Networks 359 can be any of a wide variety of different types of networks such as the Internet, a cellular network, a wide area network (WAN), a local area network (LAN), a controller area network (CAN), a near-field communication network, or any of a wide variety of other networks or communication systems.

FIG. 2 also shows remote users 366 interacting with mobile work machines 100, and remote computing systems 500 through user interfaces mechanisms 364 over networks 359. In some examples, user interface mechanisms 364 may include joysticks, levers, a steering wheel, linkages, pedals, buttons, wireless devices (e.g., mobile computing devices, etc.), dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, the remote users 366 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

FIG. 2 also shows that one or more operators 360 may operate mobile work machines 100. Operators 360 that operate a mobile work machine 100 interact with operator interface mechanisms 318. In some examples, operator interface mechanisms 318 may include joysticks, levers, a steering wheel, linkages, pedals, buttons, wireless devices (e.g., mobile computing devices, etc.), dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, the operators 360 may interact with operator interface mechanisms 318 using touch gestures. These examples described above are provided as illustrative examples and are not intended to limit the scope of the present disclosure. Consequently, other types of operator interface mechanisms 318 may be used and are within the scope of the present disclosure.

Remote computing systems 500 can be a wide variety of different types of systems, or combinations thereof. For example, remote computing systems 500 can be in a remote server environment. Further, remote computing systems 500 can be remote computing systems, such as mobile devices, a remote network, a farm manager system, a vendor system, or a wide variety of other remote systems.

While the example shown in FIG. 2 illustrates items being distributed across work system 300 in a particular way, in other examples, one or more of the items shown in FIG. 2 can be, alternatively or additionally, located elsewhere. For example, predictive data selection system 336 can, alternatively or additionally, be located on remote computing systems 500. Thus, it will be understood that the items in work system 300 can be distributed in various ways, including ways that differ from the example shown in FIG. 2.

Figure 3:
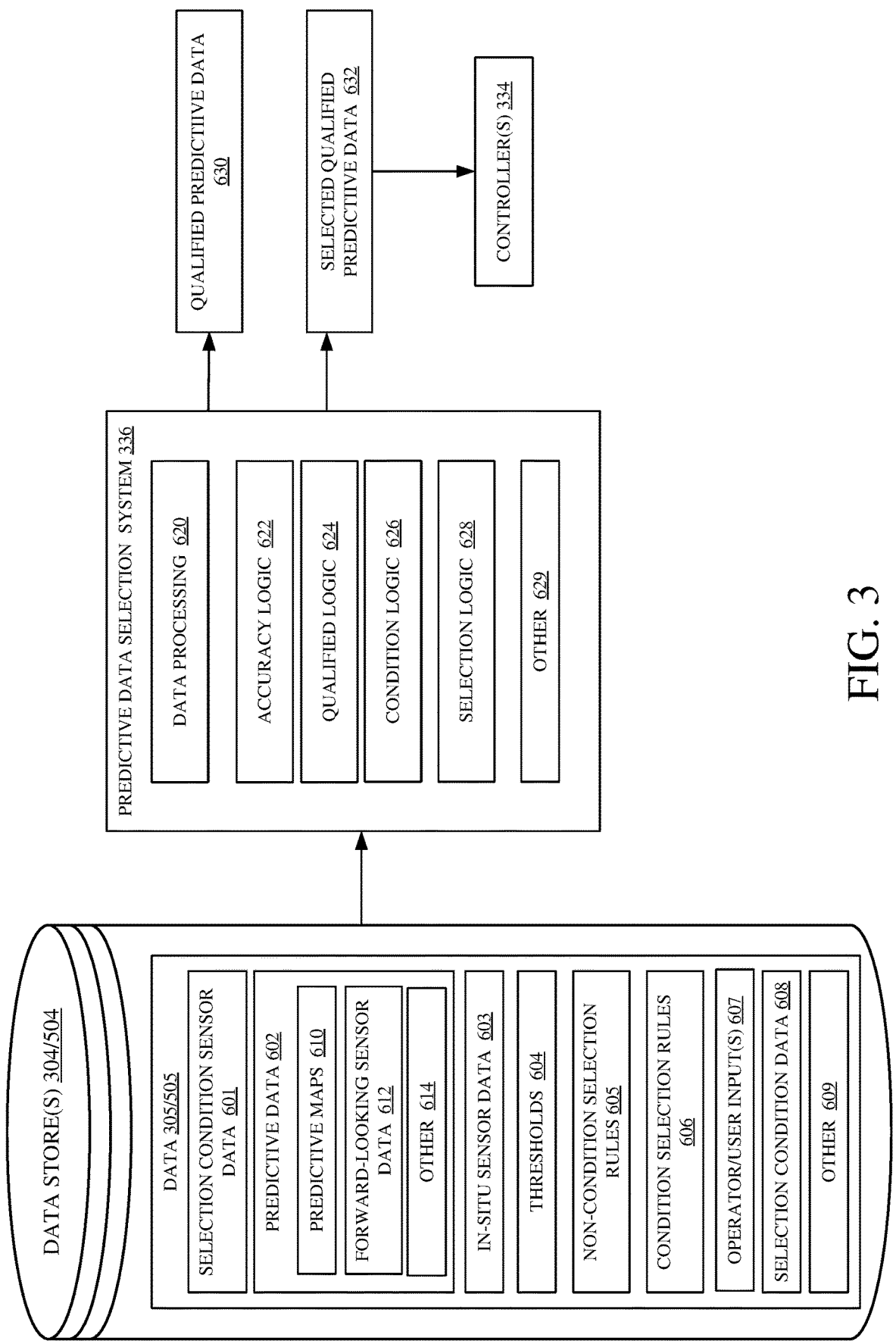
FIG. 3 is a block diagram showing one example of a predictive data selection system.

FIG. 3 is a block diagram of portions of agricultural system 300, including predictive data selection system 336 shown in FIG. 2, in more detail. FIG. 3 also shows the information flow among the various components shown. As illustrated, predictive data selection system 336 obtains (e.g., retrieves or receives) data 305 or 505, or both, and provides, as an output, selected qualified predictive data 632, based thereon. The selected qualified predictive data 632 are obtained by controllers 334 and can be used to control various items of agricultural system 300.

Data 305 or 505, or both, can include selection condition sensor data 601, predictive data 602, in-situ sensor data 603, one or more thresholds 604, one or more non-condition selection rules 605, one or more condition selection rules 606, one or more user or operator inputs 607, selection condition data 608, and can include various other data 609.

Selection condition sensor data 601 is sensor data generated by selection condition sensors 324. Selection condition sensor data 601 can be used to identify whether a selection condition is present.

Predictive data 602 includes one or more predictive maps 610, forward-looking sensor data 612 (generated by forward-looking sensors 320), and can include various other predictive data 614. Predictive maps 610 includes predictive values of one or more characteristics at a worksite corresponding to different geographic locations in the worksite. Predictive maps 610 provide predictive values of one or more characteristics at different geographic locations in the worksite ahead of the mobile work machine 100 (e.g., relative to a travel direction or route of mobile work machine 100). It will be understood that predictive maps 610 can include a plurality of different predictive maps, each different map, generated in a different way than another map. For example, predictive maps 610 can include predictive maps generated before or during a current operation. Predictive maps 610 can include predictive maps generated based on data collected prior to the current operation (e.g., data collected previously in the same year, data collected in a previous year, or a combination), data collected during the current operation (e.g., sensor data generated during a current operation), or a combination (e.g., based on data collected during a prior to a current operation). Additionally, predictive maps 610 can include predictive maps generated based on data from different types of sensors, such as predictive maps based on sensor data generated by sensors on aerial vehicles (e.g., satellites, drones, etc.) or predictive maps based on sensor data generated by sensors on ground-based vehicles. Thus, it will be understood that predictive maps 610 can include a plurality of predictive maps, each predictive map, of the plurality of predictive maps, can predict the same characteristic but in different ways (e.g., each map may be generated in a different way even though predictive of the same characteristic).

Forward-looking sensor data 612 is sensor data generated by forward-looking sensors 320. Forward-looking sensor data 612 can be used to identify predictive values of one or more characteristics at a worksite corresponding to different geographic locations in the worksite. Forward-looking sensor data 612 can be used to identify predictive values of one or more characteristics at different geographic locations in the worksite ahead of the mobile work machine 100 (e.g., relative to a travel direction or route of mobile work machine 100).

Predictive data 602 can include various other predictive data 614, for example, but not by limitation, other predictive data 614 could include predictive values of a characteristic for a current pass based on sensed values of the characteristic from a previous pass.

In-situ sensor data 603 is sensor data generated by in-situ sensors 322. In-situ sensor data 603 can be used to identify in-situ values of one or more characteristics at a worksite corresponding to different geographic locations in the worksite. In some examples, in-situ sensor data 603 can provide in-situ values for one or more of the characteristics to which the predictive values, provided by or derived from predictive data 602, correspond. In some examples, these in-situ values are referred to as ground truth values.

Thresholds 603 can include set or desired accuracy threshold levels (or values) useable by predictive data selection system 336 to determine whether predictive data 602 is qualified predictive data 630. The accuracy thresholds can indicate a minimum set or desired accuracy metric. The accuracy thresholds can indicate a threshold acceptable difference between a predictive value and an in-situ or ground truth value. The accuracy threshold(s) can be operator or user selected or can be preset (such as by a third-party (e.g., the manufacturer)). The accuracy threshold(s) can be adapted during the course of an operation, such as by a threshold adaptation algorithm.

Non-condition selection rules 605 are rules used by predictive data selection system to select a qualified predictive data 630 as a selected qualified predictive data 632 where it is determined that no selection condition is present. Non-condition selection rules 605 can indicate that data of the qualified predictive data 630 with the highest accuracy is to be selected as the selected qualified predictive data 632. In another example, non-condition selection rules 605 can indicate that when one type of predictive data 602 (e.g., a predictive map 610) and another, different type of predictive data 602 (e.g., forward-looking sensor data 612, a different type of predictive map 610) are both qualified predictive data 630, one is to be selected, as selected qualified predictive data 632, over the other, even when the other data is of a higher accuracy than the one to be selected according to the non-condition selection rules 605. In another example, non-condition selection rules 605 can provide a ranking list for different types of predictive maps 610 such that when multiple predictive maps 610 are qualified predictive data 630, one of the predictive maps 610 is selected, as selected qualified predictive data 632, based on the ranking list. These are merely some examples. The non-condition selection rules 605 can be operator or user selected or can be preset (such as by a third-party (e.g., the manufacturer).

Condition selection rules 606 are rules used by predictive data selection system 336 to select a qualified predictive data 630 as a selected qualified predictive data 632 where it is determined that a selection condition is present. For example, condition selection rules 606 can 6 indicate that when one type of predictive data 602 (e.g., a predictive map 610) and another, different type of predictive data 602 (e.g., forward-looking sensor data 612, another type of predictive map 610) are both qualified predictive data 630, one is to be selected, as selected 9 qualified predictive data 632, over the other when a selection condition is present, even when the other data is of a higher accuracy than the one to be selected according to the condition selection rules 606. This is merely one example. The condition selection rules 606 can be operator or user selected or can be preset (such as by a third-party (e.g., the manufacturer)).

For example, where a selection condition, such as slug feeding, is determined as being present, condition selection rules 606 may command that forward-looking sensor data 612 is to be used over map data (e.g., a predictive map 610). For example, forward-looking sensor data 612 may provide better (e.g., better than map data) context as to why slug feeding is occurring.

In another example, where a selection condition, such as a level of greenness of vegetation at the worksite, is determined as being present, condition selection rules 606 may command that forward-looking sensor data 612 is to be used over map data (e.g., a predictive map 610). For example, at the time of harvest, crop plants are generally dry and brown. Thus, greenness at the worksite at the time of harvest may be a result of non-crop plants (e.g., weeds) or of non-mature/non-dry crop plants, or both. It can be difficult to determine the cause of the greenness based on map data, and thus, forward-looking sensor data 612 may provide better (e.g., better than map data) context. For instance, map data (e.g., a predictive map 610) may be generated at a time when all of the vegetation at the field is green and thus, may not distinguish between non-crop and crop plants, or, non-crop plants may pop up after the time at which the map (or the data for the map) is generated.

In another example, where a selection condition, such as obscurants, is determined as being present, condition selection rules 606 may command that map data (e.g., a predictive map 610) is to be used over forward-looking sensor data 612. An obscurant selection condition can include dust or other debris in the air (e.g., a threshold amount of dust or other debris in the air), a low level (e.g., relative to a threshold) of ambient light, a low level (e.g., relative to a threshold) camera lens cleanliness (i.e., a camera lens is dirty at least to a threshold level), as well as various other obscurant selection conditions. Obscurants may affect the ability of forward-looking sensors to accurately detect characteristics at the worksite and thus, map data (e.g., a predictive map 610) may be more accurate at least while the obscurants are present.

In another example, where a selection condition, such as topography (e.g., elevation variability), is determined as being present, condition selection rules 606 may command that map data (e.g., a predictive map 610) is to be used over forward-looking sensor data 612. Highly (e.g., relative to a threshold) variable topography (e.g., sudden or frequent increases or decreases in elevation) at the worksite ahead of the mobile work machine 100 may affect the ability of forward-looking sensors to accurately detect characteristics at the worksite and thus, map data (e.g., a predictive map 610) may be more accurate at least while the highly variable topography is present.

In another example, where a selection condition, such as a threshold amount of time since the forward-looking sensors have been calibrated has passed, is determine as being present, condition selection rules 606 may command that map data (e.g., a predictive map 610) is to be used over forward-looking sensor data 612. In another example, where a selection condition, such as a particular crop condition (e.g., down crop, etc.), is determined as being present, condition selection rules 606 may command that one particular type of predictive data is used over other types of predictive data. For example, when crop is down (also referred to as lodged crop), it May be preferable to use map data (e.g., a predictive map 610) rather than forward-looking sensor data 612. In other examples, where other types of crop conditions are present, it may be preferable to use forward-looking sensor data 612 rather than map data (e.g., a predictive map 610). In another example, where a selection condition, such as a threshold amount of oscillation (e.g., bouncing) of the work machine, is determined as being present, condition selection rules 606 may command that map data (e.g., a predictive map 610) is to be used over forward-looking sensor data 612. For example, high levels (e.g., relative to a threshold) of oscillation (or bouncing) of the work machine may cause the forward-looking sensors to provide inaccurate data.

These are merely some examples of selection condition and commands of selection condition rules 606. Various other selection conditions and commands of selection conditions rules 606 are contemplated herein.

Operator or user inputs 607 are inputs provided by an operator 360 (e.g., through operator interface mechanism 318) or remote user 366 (e.g., through a remote user interface mechanism 364), or both. In one example, operator or user inputs 607 may provide values of characteristics that can be used as ground truth values by predictive data selection system 336. In another example, operator or user inputs 607 may provide an indication as to whether a selection condition is present.

Selection condition data 608 indicates select or preset selection conditions which are considered by predictive data selection system 336 in determining whether a selection condition is present. Selection conditions, of selection condition data 608, can be operator or user selected or can be present (such as by a third-party (e.g., the manufacturer).

Data stores 305 and 505 can include various other data 609 some examples of which have been previously discussed. Other data 609 can also include other sensor data generated by sensors 308 (e.g., heading/speed sensors 325, geographic position sensors 303, and other sensors 328).

As illustrated in FIG. 3, predictive data selection system 336 includes data processing 620, accuracy logic 622, qualified logic 624, condition logic 626, selection logic 628, and can include various other items 629 as well.

Data processing 620 illustratively processes data 602, 603, and 607 to identify or extract characteristic values (e.g., predictive characteristic values, in-situ or ground truth characteristic values, etc.). For example, data processing 620 can process predictive data 602 to identify or extract predictive values of one or more characteristics. In some examples, data processing 620 can include an algorithm (e.g., model, function, equation, etc.) to convert a value provided by the predictive data 602 to extract a predictive value. For instance, predictive data 602 in the form of forward-looking sensor data 612 may provide crop height values ahead of the mobile work machine 100 which can be used by data processing 620 to extract predictive biomass values of crop ahead of the mobile work machine 100. This is merely one example. Data processing 620 can process in-situ sensor data 603 or operator/user inputs 607, or both, to identify or extract in-situ or ground truth characteristic values. Data processing 620 can process sensor data generated by heading/speed sensors 325 to extract values indicative of machine speed or machine heading, or both. Sensor data processing 620 can process sensor data generated by geographic position sensors 303 to extract values indicative of machine position or location. Sensor data processing 620 can also locate the identified or extracted characteristic values to a location on the worksite. In some examples, the values may already be georeferenced, such as in the case of a predictive map 610, in which case, sensor data processing 620 identifies the geographic location as provided by the predictive map 610. In other examples, sensor data processing can geolocate the identified or extracted characteristic values to a location on the worksite based on one or more of a geographic location of the mobile work machine 100 (as indicated by sensor data generated by geographic position sensors 303), travel speed of the mobile work machine 100 (as indicated by sensor data generated by heading/speed sensors 325), and travel direction (or heading) of the mobile work machine 100 (as indicated by sensor data generated by heading/speed sensors 325).

Data processing 620 can include or utilize various image processing functionalities such as sequential image comparison, color extraction (e.g., RGB color extraction, etc.), edge detection, black/white analysis, pixel testing, pixel clustering, shape detection, as well as any number of other suitable image processing functionalities. Additionally, data processing 620 can include or utilize various machine learning functionalities or various artificial intelligence functionalities, or both. Additionally, sensor data processing 620 can include or utilize various other data processing functionalities such as filtering, noise reduction, categorization, normalization, and aggregation.

Accuracy logic 622 illustratively determines an accuracy of different items of predictive data 602 (e.g., an accuracy of each one of one or more predictive maps 610, an accuracy of forward-looking sensor data 612, and an accuracy of one of one or more other predictive data 614). Accuracy logic 622, to determine an accuracy of a given item of predictive data 602, compares predictive values of a characteristic, provided by or extracted from the given item of predictive data 602, to corresponding (i.e., corresponding to the same geographic locations) in-situ or ground truth values of the characteristic and generates an accuracy metric based on the comparison. The accuracy metric may indicate the amount of times that the predictive values were the same as (or within a threshold difference of) the corresponding in-situ or ground truth values. Thus, an accuracy metric, such as ninety percent (90%) may indicate that the predictive values are 90% accurate (i.e., are the same as or within a threshold of in-situ or ground truth values 90% of the time).

Qualified logic 624 illustratively identifies qualified predictive data 630 based on the accuracy metrics determined by accuracy logic 622. For example, qualified logic 624 may compare the accuracy metric of each item of predictive data 602 to an accuracy threshold and identify, as the qualified predictive data 630, the items of predictive data 602 having an accuracy metric that satisfies (e.g., meets or exceeds) the accuracy threshold. It will be understood that by qualified, it is meant that the predictive data is satisfactorily accurate for purposes of control, at least at a high frequency.

Condition logic 626 determines whether a selection condition is present at the worksite during a current operation based on data 305 or 505, or both. For example, condition logic 626 determines whether a selection condition is present based on data indicating the presence of a selection condition (e.g., selection condition sensor data 601 or operator/user inputs 607, or both) and selection condition data 608 which indicates the selection conditions that are to be looked for. For example, selection condition data 608 may indicate that obscurants at the worksite are to be considered as selection conditions, and thus, are to be looked for by condition logic 624. Selection condition sensor data 601 or operator/user inputs 607, or both, may indicate that obscurants are present at the worksite. Thus, condition logic 626 would determine that a selection condition, in the form of an obscurant, is present at the worksite. In another example, selection condition data 608 may indicate that slug feeding at the worksite is to be considered as a selection condition, and thus, are to be looked for by condition logic 626. Selection condition sensor data 601 or operator/user inputs 607, or both, may indicate that slug feeding is occurring. Thus, condition logic 626 would determine that a selection condition, in the form of slug feeding, is present at the worksite. These are merely some examples of selection conditions. Other selection conditions are contemplated herein.

Selection logic 628 selects an items of qualified predictive data 630 as selected qualified predictive data 632. Where qualified predictive data 630 only includes one item, then selection logic 628 selects that one item as selected qualified predictive data 632.

Where qualified predictive data 630 includes a plurality of items, selection logic 628 selects one item, of the plurality of items, as selected qualified predictive data 630, based on the determination made by condition logic 626. Where condition logic 626 determines that a selection condition is present, selection logic 628 selects one item, of the plurality of items of qualified predictive data 630, as selected qualified predictive data 632, based on the selection condition identified by condition logic 626 and a corresponding condition selection rule 606. Where condition logic 626 determines that a selection condition is not present, selection logic 628 selects one item, of the plurality of items of qualified predictive data 630, as selected qualified predictive data 632, based on a non-condition selection rule 605.

As can be seen, material transfer status system 335 is operable to select an item of predictive data 602 as selected qualified predictive data 632.

Selected qualified predictive data 632 can be obtained (e.g., received or retrieved) by controllers 334.

Controllers 334 can generate control signals to control one or more items of agricultural system 300 based on the selected qualified predictive data 632. For example, controllers 334 can control one or more controllable subsystems 316 based on the selected qualified predictive data 632. In another example, controllers 334 can control one or more interfaces (e.g., 318 or 364, or both) to provide an indication (e.g., display, audible output, haptic output, etc.) based on the selected qualified predictive data 632, including, for example, displaying or otherwise presenting (e.g., audibly), at least a portion, of the qualified predictive data 632.

Various other information generated by predictive data selection system 336 can also be provided to or otherwise used by controllers 334. For example, controllers 334 can control one or more interfaces (e.g., 318 or 364, or both) to provide an indication (e.g., display, audible output, haptic output, etc.) based on the accuracy metrics determined by accuracy logic 622, including, for example, displaying or otherwise presenting (e.g., audibly), the accuracy metrics determined by accuracy logic 622. In another example, controllers 334 can control one or more interfaces (e.g., 318 or 364, or both) to provide an indication (e.g., display, audible output, haptic output, etc.) based on the presence or lack of presence of a selection condition, as determined by condition logic 626, including, for example, displaying or otherwise presenting (e.g., audibly), the presence or lack of presence of a selection condition, as determined by condition logic 626.

Figure 4A:
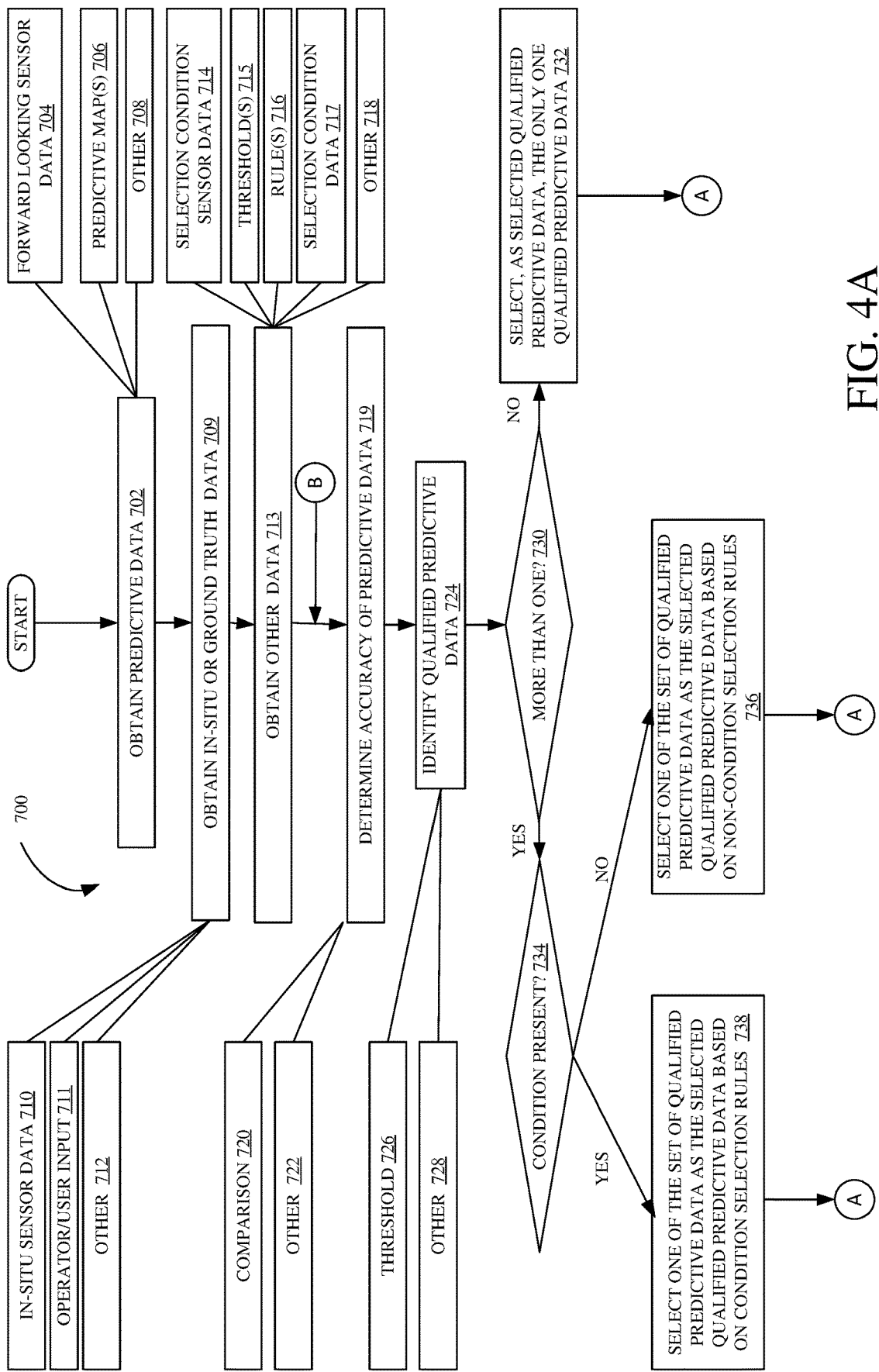
FIGS. 4A-4B (collectively referred to as FIG. 4 herein) show a flow chart illustrating one example of operation of work system architecture in selecting a predictive source and control based thereon.
Figure 4B:
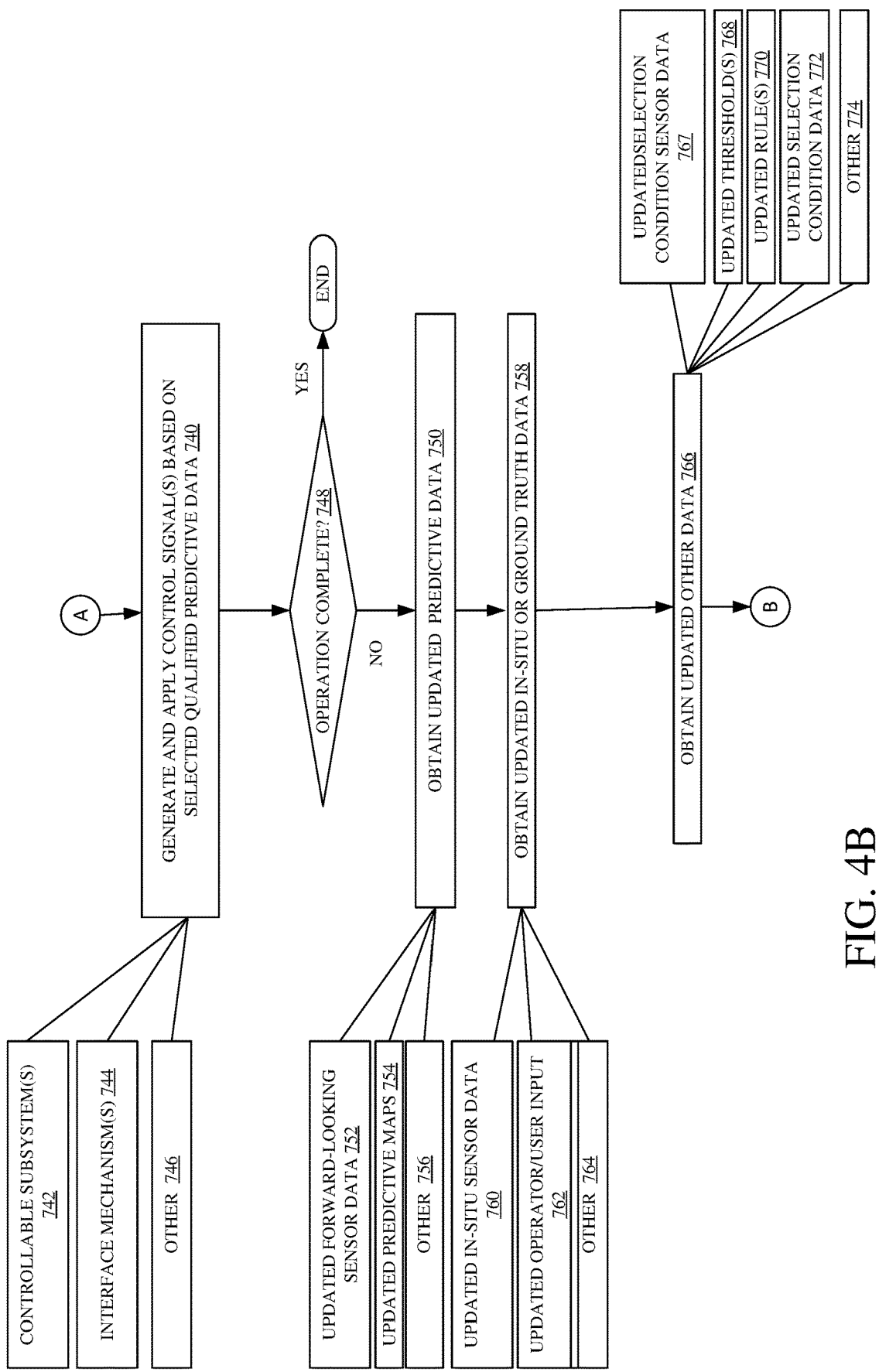

FIGS. 4A-4B (collectively referred to herein as FIG. 4) show a flowchart showing one example operation 800 of work system 300. At block 702 where one or more items of predictive data 602 are obtained (e.g., retrieved or received) by predictive data selection system 336. As indicated by block 704, one or more predictive maps 610 can be obtained as predictive data 602. As indicated by block 706, forward-looking sensor data 612, generated by forward looking sensors 320, can be obtained as predictive data 602. As indicated by block 708, various other predictive data 614 can be obtained as predictive data 602.

At block 709 in-situ or ground truth data is obtained. As indicated by block 710, in-situ sensor data 603, generated by in-situ sensors 322, can be obtained as in-situ or ground truth data. As indicated by block 711, operator or user inputs 607, indicative of ground truth data, can be obtained. As indicated by block 712 various other data, that indicates in-situ or ground truth characteristic values, can be obtained.

At block 713 various other data is obtained. As indicated by block 715 one or more thresholds 604, such as one or more accuracy thresholds, can be obtained. As indicated by block 716, one or more rules, such as one or more non-condition selection rules 605 or one or more condition selection rules 606, or both, can be obtained. As indicated by block 717, selection condition data 608 can be obtained. As indicated by block 718 various other data 609 can be obtained.

At block 719, predictive data selection system 336 (e.g., accuracy logic 622) determines an accuracy of each different predictive data of the predictive data 610 obtained at block 702 and generates an accuracy metric, indicative of the determined accuracy, for each different predictive data of the predictive data 610 obtained at block 702. As indicated by block 720, predictive data selection system 336 (e.g., accuracy logic 622) compares predictive values of characteristics provided by or extracted from each different predictive data of the predictive data 610 to corresponding (i.e., corresponding to the same geographic locations in the worksite) in-situ or ground truth values of characteristics provided by or extracted from the in-situ or ground truth data obtained at block 709. Thus, each of a plurality of predictive values of a characteristic provided by or extracted from each different predictive data of the predictive data 610 is compared to a corresponding (i.e., corresponding to the same geographic location in the worksite) in-situ or ground truth value of the characteristic. The accuracy metric for each different predictive data May indicate the number of times (or how often) the predictive values of a characteristic, of the given different predictive data, matches or is within a threshold difference of the corresponding in-situ or ground truth values of the characteristic. Thus, an accuracy metric of 95% may indicate that the predictive values of a characteristic of the given predictive data match or are within a threshold difference of in-situ or ground truth values of the characteristic 95% of the time. The threshold difference may be provided as a threshold 604.

As indicated by block 722, predictive data selection system 336 (e.g., accuracy logic 622) can determine the accuracy of each predictive data of the predictive data 610 obtained at block 702 and generates an accuracy metric, indicative of the determined accuracy, for each different predictive data of the predictive data 610 obtained at block 702 in various other ways.

At block 724, predictive data selection system 336 (e.g., qualified logic 624) identifies one or more different predictive data of the predictive data 610 as qualified predictive data 630 based on the accuracy metrics. As indicated by block 726, predictive data selection system 336 (e.g., qualified logic 624) may compare the accuracy metric of each different predictive data to an accuracy threshold. Each different predictive data with an accuracy metric that satisfies (e.g., meets or exceeds) the accuracy threshold may be identified as qualified predictive data 630. The accuracy threshold may be provided as a threshold 604.

At block 724, predictive data selection system 336 determines if there is more than one qualified predictive data 630.

If, at block 630, it is determined that there is not more than one qualified predictive data 630, then the operation 700 proceeds to block 732 where predictive data selection system 336 (e.g., selection logic 628) selects, as selected qualified predictive data 632, the only one qualified predictive data 630.

If, at block 630, it is determined that there is more than one qualified predictive data 630, then the operation 700 proceeds to block 734 where predictive data selection system 336 (e.g., condition logic 626) determines whether a selection condition is currently present at the worksite during the operation.

If, at block 734, it is determined that there is not a selection condition currently present at the worksite during the operation, then operation 700 proceeds to block 736 where predictive data selection system 336 (e.g., selection logic 628) selects one of the plurality of qualified predictive data 630 as the selected qualified predictive data 632 based on non-condition selection rules 605.

If, at block 734, it is determined that there is a selection condition currently present at the worksite during the operation, then operation 700 proceeds to block 738 where predictive data selection system 336 (e.g., selection logic 628) selects one of the plurality of qualified predictive data 630 as the selected qualified predictive data 632 based on condition selection rules 606.

From one of block 732, 736, or 738, operation proceeds at block 740 where the selected qualified predictive data 632 is obtained by controllers 334 and used to generate and apply control signals to control one or more items of work system 300. As indicated by block 742, controllers 334 can generate and apply control signals to control one or more controllable subsystems 316 based on the selected qualified predictive data 632. As indicated by block 744, controllers 334 can generate and apply control signals to control one or more interface mechanisms (e.g., 318 or 364, or both), such as to generate presentations (e.g., displays, audible or haptic presentations, etc.), based on the selected qualified predictive data 632. As indicated by block 746, controllers can generate and apply control signals to control various other items of work system 300 based on selected qualified predictive data 632.

At block 748 it is determined if the operation at the worksite is complete. If it is determined that the operation at the worksite is complete, then operation 700 ends. If it is determined that the operation at the worksite is not yet complete, then operation 700 proceeds at block 750 where one or more items of updated predictive data 602 are obtained (e.g., retrieved or received) by predictive data selection system 336. As indicated by block 752, one or more updated predictive maps 610 can be obtained as updated predictive data 602. As indicated by block 754, updated forward-looking sensor data 612, generated by forward looking sensors 320, can be obtained as updated predictive data 602. As indicated by block 756, various other updated predictive data 614 can be obtained as updated predictive data 602.

At block 758 updated in-situ or ground truth data is obtained. As indicated by block 760, updated in-situ sensor data 603, generated by in-situ sensors 322, can be obtained as updated in-situ or ground truth data. As indicated by block 762, updated operator or user inputs 607, indicative of ground truth data, can be obtained. As indicated by block 764 various other updated data, that indicates in-situ or ground truth characteristic values, can be obtained.

At block 766 various other updated data is obtained. As indicated by block 767 one or more updated thresholds 604, such as one or more updated accuracy thresholds, can be obtained. As indicated by block 768, one or more updated rules, such as one or more updated non-condition selection rules 605 or one or more updated condition selection rules 606, or both, can be obtained. As indicated by block 770, updated selection condition data 608 can be obtained. As indicated by block 772 various other data 609 can be obtained.

Operation 700 returns to block 719 where the accuracy of the predictive data, including the updated predictive data, is determined. In this way, the updated data, obtained at one or more of blocks 750, 758, and 766 are accounted for in the next iteration of selecting the selected qualified predictive data 632. It will be understood that, in some examples, some predictive data 602 may not be updated while other predictive data 602. For example, some predictive maps 610 may not be updated while other predictive data 602 (e.g., forward looking sensor data 612, and, in some examples, other predictive maps 610) are updated. It will be understood that in some examples, some other data may not be updated. For instance, in some examples, thresholds 604, non-condition selection rules 605, condition selection rules 606, and selection condition data 608 may not be updated.

Operation 700 then proceeds from block 719 as previously described.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, generators, and interactions. It will be appreciated that any or all of such systems, components, generators, and interactions may be implemented by hardware items, such as one or more processors, one or more processors executing computer executable instructions stored in memory, memory, or other processing components, some of which are described below, that perform the functions associated with those systems, components, generators, or interactions. In addition, any or all of the systems, components, generators, and interactions may be implemented by software that is loaded into a memory and is subsequently executed by one or more processors or one or more servers or other computing component(s), as described below. Any or all of the systems, components, generators, and interactions may also be implemented by different combinations of hardware, software, firmware, etc., some examples of which are described below. These are some examples of different structures that may be used to implement any or all of the systems, components, generators, and interactions described above. Other structures may be used as well.

Figure 5:
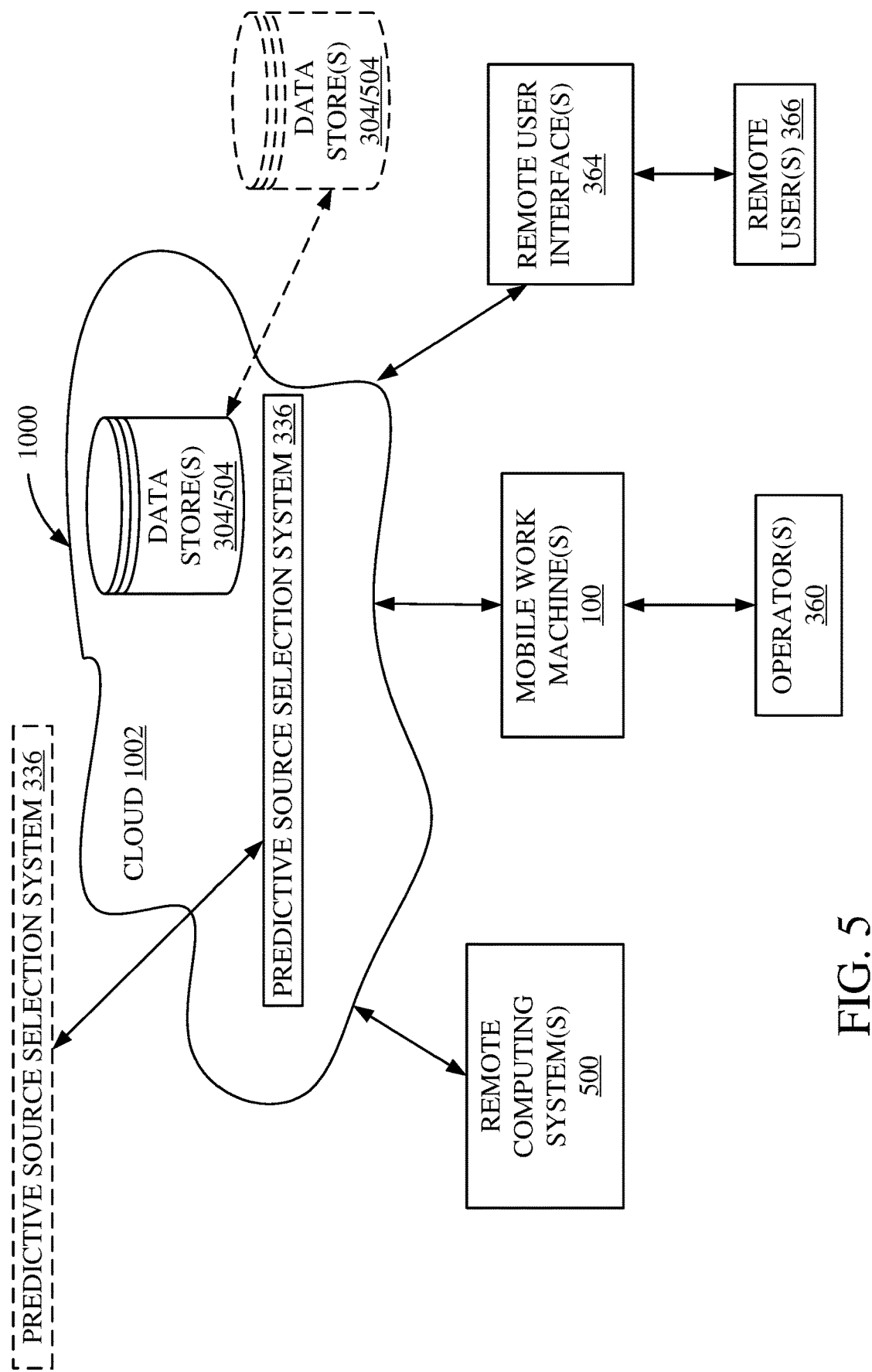
FIG. 5 is a block diagram showing one example of items of a work system architecture in communication with a remote server architecture.

FIG. 5 is a block diagram of a remote server architecture 1000. FIG. 5, also shows one or more mobile work machines 100, one or more remote computing systems 500, and one or more remote user interface mechanisms 364 in communication with the remote server environment. The mobile work machines 100, remote computing systems 500, and remote user interface mechanisms 364 communicate with elements in a remote server architecture 1000. In some examples, remote server architecture 1000 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in previous figures as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 5, some items are similar to those shown in previous figures and those items are similarly numbered. FIG. 5 specifically shows that predictive data selection system 336 and one or more of data stores 304 and data stores 504, may be located at a server location 1002 that is remote from the mobile work machines 100, remote computing systems 500, and remote user interface mechanisms 364. Therefore, in the example shown in FIG. 5, mobile work machines 100, remote computing systems 500, and remote user interface mechanisms 364 access systems through remote server location 1002. In other examples, various other items May also be located at server location 1002, such as various other items of work system architecture 300.

FIG. 5 also depicts another example of a remote server architecture. FIG. 5 shows that some elements of previous figures may be disposed at a remote server location 1002 while others may be located elsewhere. By way of example, one or more of data store(s) 304 and 504 may be disposed at a location separate from location 1002 and accessed via the remote server at location 1002. Similarly, predictive data selection system 336 may be disposed at a location separate from locations 1002 and accessed via the remote server at locations 1002. Regardless of where the elements are located, the elements can be accessed directly by mobile work machines 100, remote computing systems 500, and remote user interface mechanisms 364 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As a mobile machine (e.g., mobile work machine 100) comes close to the machine containing the information collection system, such as a fuel truck prior to fueling, the information collection system collects the information from the mobile machine using any type of ad-hoc wireless connection. The collected information may then be forwarded to another network when the machine containing the received information reaches a location where wireless telecommunication service coverage or other wireless coverage is available. For instance, a fuel truck may enter an area having wireless communication coverage when traveling to a location to fuel other machines or when at a main fuel storage location. All of these architectures are contemplated herein. Further, the information may be stored on a mobile machine until the mobile machine enters an area having wireless communication coverage. The mobile machine, itself, May send the information to another network.

It will also be noted that the elements of previous figures, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1000 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 6:
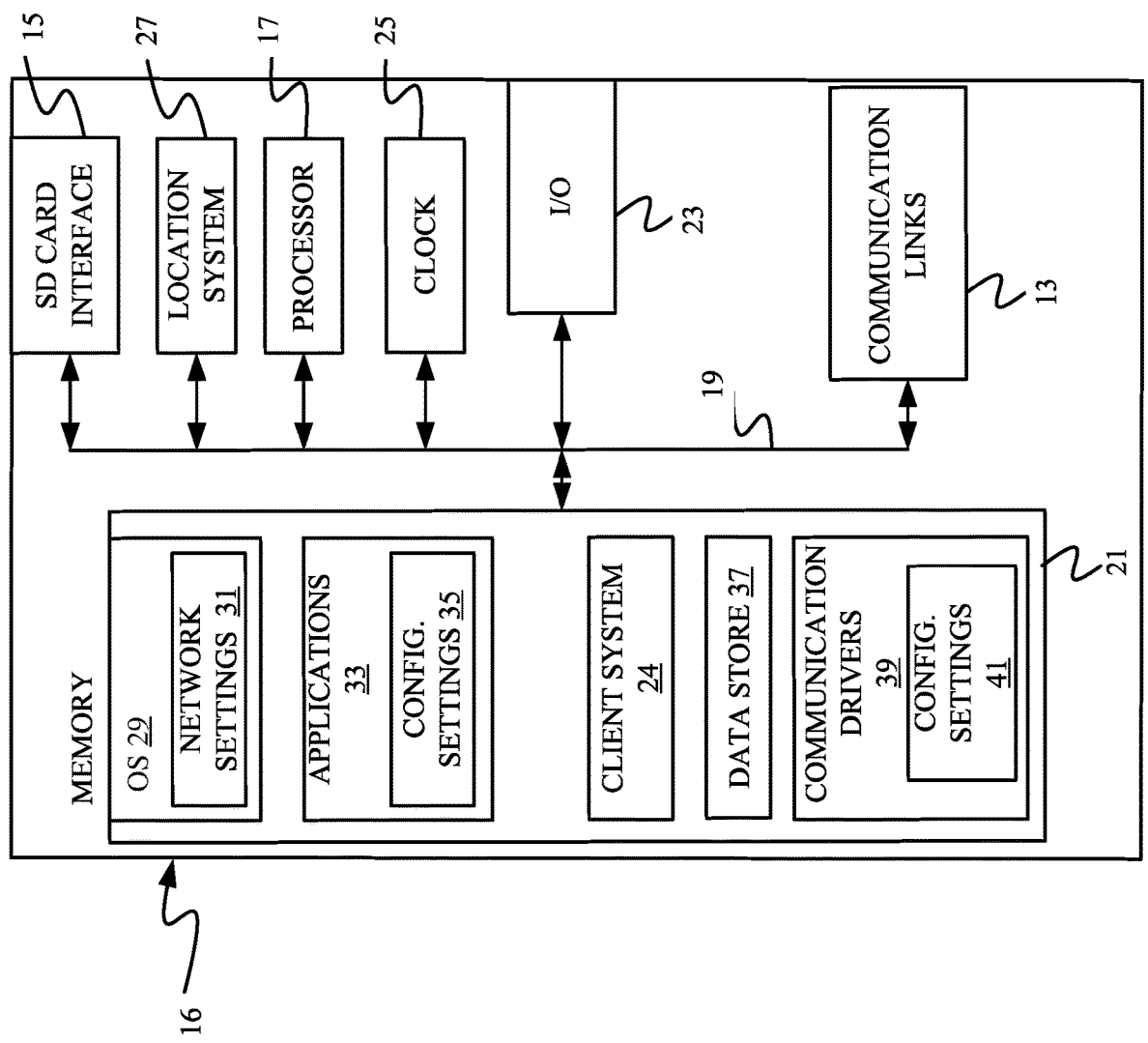
FIGS. 6-8 show examples of mobile devices that can be used in a work system architecture.
Figure 7:
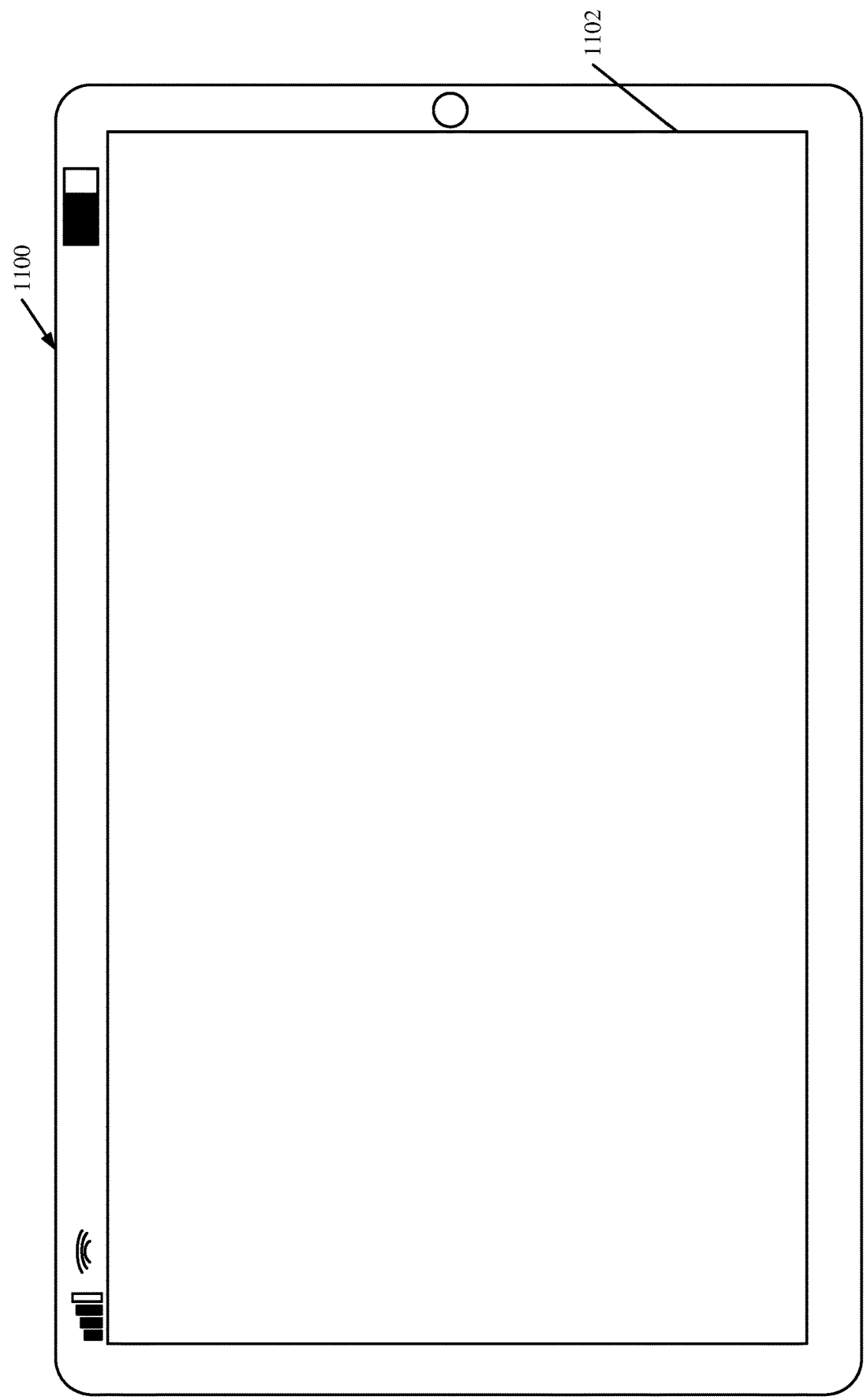
Figure 8:
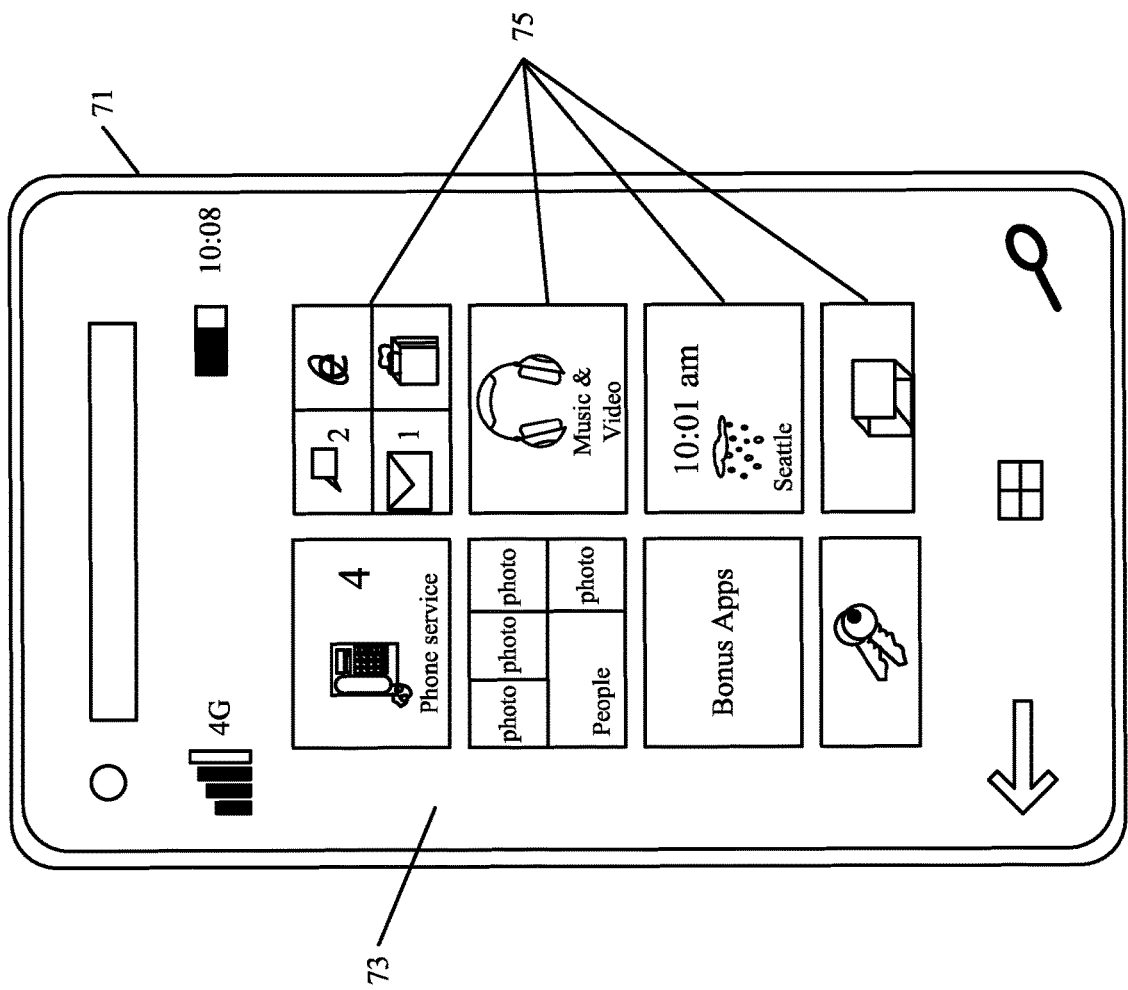

FIG. 6 is a simplified block diagram of one illustrative example of a handheld or mobile computing device that can be used as a user's or client's handheld device 16, in which the present system (or parts of it) can be deployed. For instance, a mobile device can be deployed in the operator compartment of a mobile machine (e.g., a mobile work machine 100) for use in generating, processing, or displaying the material transfer status outputs and interlock outputs discussed above. FIGS. 7-8 are examples of handheld or mobile devices.

FIG. 6 provides a general block diagram of the components of a client device 16 that can run some components shown in previous figures, that interact with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, client system 24, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 7 shows one example in which device 16 is a tablet computer 1100. In FIG. 7, computer 1100 is shown with user interface display screen 1102. Screen 1102 can be a touch screen or a pen-enabled interface that receives inputs from a pen or stylus. Tablet computer 1100 may also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 8 is similar to FIG. 7 except that the device is a smart phone 71. Smart phone has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
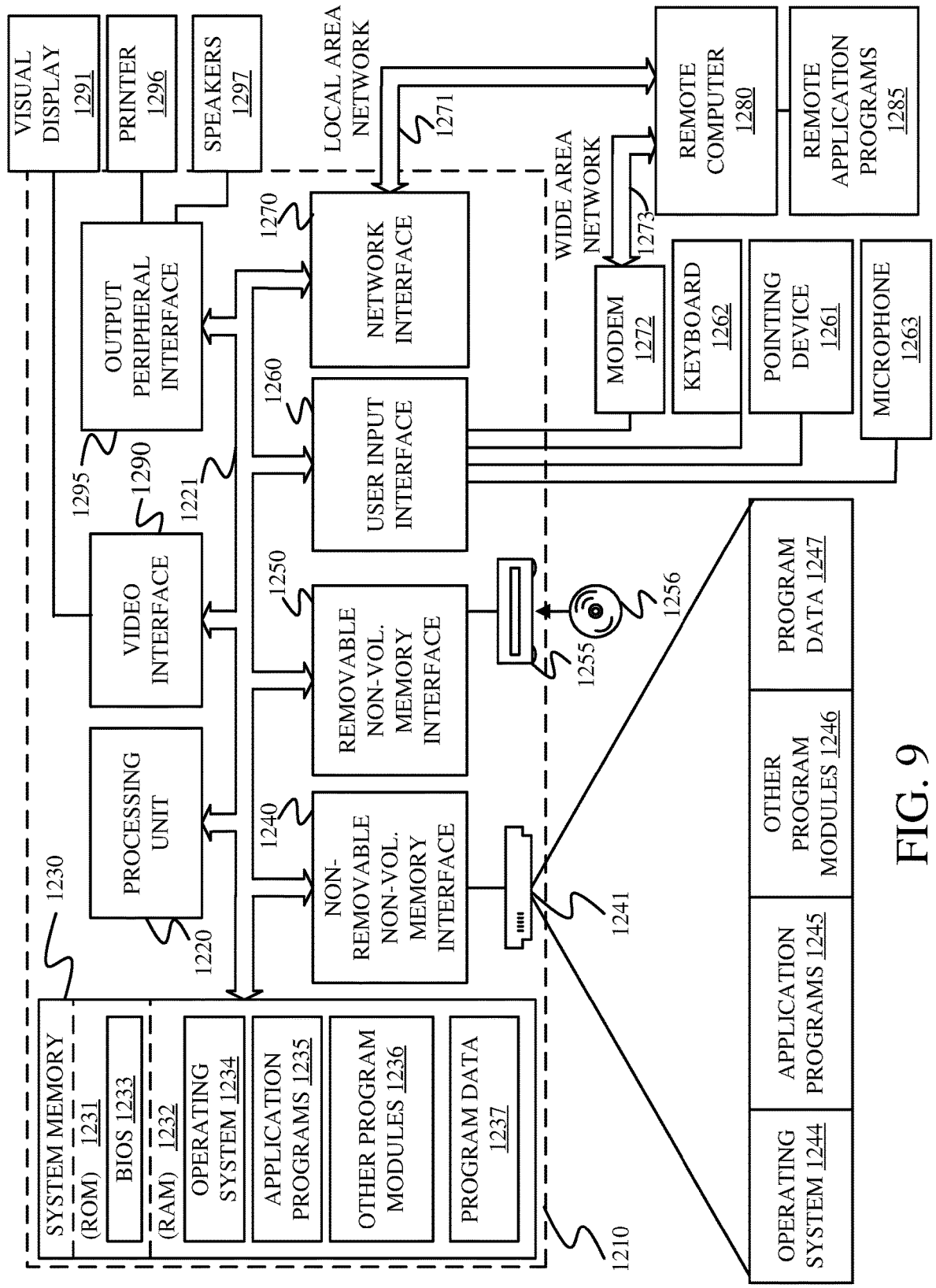
FIG. 9 is a block diagram showing one example of a computing environment that can be used in a work system architecture.

FIG. 9 is one example of a computing environment in which elements of previous figures described herein can be deployed. With reference to FIG. 9, an example system for implementing some embodiments includes a computing device in the form of a computer 1210 programmed to operate as discussed above. Components of computer 1210 may include, but are not limited to, a processing unit 1220 (which can comprise processors or servers from previous figures), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to previous figures described herein can be deployed in corresponding portions of FIG. 9.

Computer 1210 typically includes a variety of computer readable media. Computer readable media may be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 9 illustrates operating system 1234, application programs 1235, other program modules 1236, and program data 1237.

The computer 1210 may also include other removable/non-removable volatile/nonvolatile computer storage media. By way of example only, FIG. 9 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 1210. In FIG. 9, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network-CAN, local area network-LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 9 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. A computer implemented method of controlling a mobile work machine at a worksite, the computer implemented method comprising:
    obtaining a plurality of predictive data, each predictive data of the plurality of predictive data indicative of respective predictive values of a characteristic corresponding to geographic locations at the worksite;
    obtaining in-situ data indicative of in-situ values of the characteristic corresponding to the geographic locations at the worksite;
    determining a respective accuracy of each predictive data, of the plurality of predictive data, based on the respective predictive values of the characteristic and the in-situ values of the characteristic;
    identifying, based on the respective accuracy of each predictive data, a set of qualified predictive data, the identified set of qualified predictive data comprising two or more of the predictive data of the plurality of predictive data, wherein identifying the set of qualified predictive data comprises comparing the respective accuracy of each predictive data to an accuracy threshold;
    determining whether a selection condition is present at the worksite;
    selecting one qualified predictive data of the identified set of qualified predictive data as selected qualified predictive data based on the determination of whether the selection condition is present at the worksite; and
    controlling the mobile work machine based on the selected qualified predictive data.

2. The computer implemented method of claim 1, wherein obtaining the plurality of predictive data comprises obtaining, as a first one of the plurality of predictive data, a predictive map and obtaining, as second one of the plurality of predictive data, forward-looking sensor data.

3. The computer implemented method of claim 1, wherein determining the respective accuracy of each predictive data comprises comparing each respective predictive value of each predictive data to a corresponding in-situ value of the in-situ values of the characteristic.

4. The computer implemented method of claim 3, wherein comparing each respective predictive value of each predictive data to a corresponding in-situ value of the in-situ values of the characteristic comprises determining a difference between each respective predictive value of each predictive data and the corresponding in-situ value of the in-situ values of the characteristic and wherein determining the respective accuracy of each predictive data further comprises determining a respective number of times that the respective predictive values of each predictive data match or are within a threshold difference of the corresponding in-situ values, based on the determined difference between each respective predictive value of each predictive data and the corresponding in-situ value of the in-situ values of the characteristic.

5. The computer implemented method of claim 1, wherein determining whether the selection condition is present comprises obtaining, from selection condition sensors, selection condition sensor data indicative of whether the selection condition is present.

6. The computer implemented method of claim 1, wherein determining whether the selection condition is present comprises determining that the selection condition is present and wherein selecting the selected qualified predictive data comprises selecting the selected qualified predictive data based on condition selection rules.

7. The computer implemented method of claim 1, wherein determining whether the selection condition is present comprises determining that the selection condition is not present and wherein selecting the selected qualified predictive data comprises selecting the selected qualified predictive data based on non-condition selection rules.

8. A mobile work machine comprising:
ground engaging traction elements configured to carry the mobile work machine across a worksite;
one or more processors;
memory; and
computer executable instructions, stored in the memory, the computer executable instructions, when executed by the one or processors, configuring the one or more processors to:
obtain a plurality of predictive data, each predictive data, of the plurality of predictive data, indicative of respective predictive values of a characteristic corresponding to geographic locations at the worksite;
obtain in-situ data indicative of in-situ values of the characteristic corresponding to the geographic locations at the worksite;
compare each respective predictive value of each predictive data to a corresponding in-situ value of the in-situ values of the characteristic to determine a difference between each respective predictive value of each predictive data and the corresponding in-situ value of the in-situ values of the characteristic:
determine a respective number of times that the respective predictive values of each predictive data match or are within a threshold difference of the corresponding in-situ values based on the determined difference between each respective predictive value of each predictive data and the corresponding in-situ value of the in-situ values of the characteristic
determine a respective accuracy of each predictive data, of the plurality of predictive data, based on the determined respective number of times that the respective predictive values of each predictive data match or are within the threshold difference of the corresponding in-situ values of the in-situ values of the characteristic;
identify, based on the respective accuracy of each predictive data, a set of qualified predictive data, the identified set of qualified predictive data comprising two or more of the predictive data of the plurality of predictive data;
determine whether a selection condition is present at the worksite;
select one qualified predictive data of the identified set of qualified predictive data as selected qualified predictive data based on the determination of whether the selection condition is present at the worksite; and
control the mobile work machine based on the selected qualified predictive data.

9. The mobile work machine of claim 8, wherein the plurality of predictive data comprises at least, as a first one of the plurality of predictive data, a predictive map indicative of respective predictive values of the characteristic corresponding to the geographic locations at the worksite and, as a second one of the plurality of predictive data, forward-looking sensor data generated by a forward-looking sensor on the mobile work machine and indicative of respective predictive values of the characteristic corresponding to geographic locations at the worksite.

10. The mobile work machine of claim 8, wherein the computer executable instructions, when executed by the one or more processors, further configure the one or more processors to compare the respective accuracy of each predictive data to an accuracy threshold and to identify the set of qualified predictive data based on the comparison of the respective accuracy metric of each predictive data to the accuracy threshold.

11. The mobile work machine of claim 8, wherein the computer executable instructions, when executed by the one or more processors, further configure the one or more processors to:
obtain selection condition sensor data, indicative of whether the selection condition is present;
determine that the selection condition is present based on the selection condition sensor data; and
select the selected qualified predictive data based on condition selection rules.

12. The mobile work machine of claim 8, wherein the computer executable instructions, when executed by the one or more processors, further configure the one or more processors to:
obtain selection condition sensor data, indicative of whether the selection condition is present;
determine that the selection condition is not present based on the selection condition sensor data; and
select the selected qualified predictive data based on non-condition selection rules.

13. A system comprising:
a selection condition sensor configured to detect a selection condition and generate selection condition sensor data;
one or more processors;
memory; and
computer executable instructions, stored in the memory, the computer executable instructions, when executed by the one or processors, configuring the one or more processors to:
obtain a plurality of predictive data, each predictive data of the plurality of predictive data indicative of respective predictive values of a characteristic corresponding to geographic locations at a worksite;
obtain in-situ data indicative of in-situ values of the characteristic corresponding to the geographic locations at the worksite;
determine a respective accuracy of each predictive data of the plurality of predictive data based on the respective predictive values of the characteristic and the in-situ values of the characteristic;
identify, based on the respective accuracy of each predictive data, a set of qualified predictive data, the identified set of qualified predictive data comprising two or more of the predictive data of the plurality of predictive data;
determine that a selection condition is not present at the worksite based on the selection condition sensor data;
select one qualified predictive data of the identified set of qualified predictive data as selected qualified predictive data based on non-condition selection rules; and
control a mobile work machine based on the selected qualified predictive data.

14. The system of claim 13, wherein the plurality of predictive data comprises at least, as a first one of the plurality of predictive data, a predictive map indicative of respective predictive values of the characteristic corresponding to the geographic locations at the worksite, as a second one of the plurality of predictive data, forward-looking sensor data, generated by a forward-looking sensor on the mobile work machine and indicative of respective predictive values of the characteristic corresponding to the geographic locations at the worksite.

15. The system of claim 13, wherein the computer executable instructions, when executed by the one or more processors, further configure the one or more processors to compare each respective predictive value of each predictive data to a corresponding in-situ value of the in-situ values of the characteristic and determine the respective accuracy of each predictive data based on the comparison of each respective predictive value of each predictive data to the corresponding in-situ value of the in-situ values.

\* \* \* \* \*